US009043695B2

(12) United States Patent
Saito

(10) Patent No.: US 9,043,695 B2
(45) Date of Patent: May 26, 2015

(54) VISUALIZING TOTAL ORDER RELATION OF NODES IN A STRUCTURED DOCUMENT

(75) Inventor: Shin Saito, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 13/301,828

(22) Filed: Nov. 22, 2011

(65) Prior Publication Data

US 2012/0137209 A1  May 31, 2012

(30) Foreign Application Priority Data

Nov. 26, 2010  (JP) ................................. 2010-264010

(51) Int. Cl.
*G06F 17/00* (2006.01)
*G06F 17/30* (2006.01)

(52) U.S. Cl.
CPC .... *G06F 17/30011* (2013.01); *G06F 17/30961* (2013.01)

(58) Field of Classification Search
CPC .................... G06F 17/30327; G06F 17/30961; G06F 17/30011
USPC .......................................................... 715/234
See application file for complete search history.

(56) References Cited

U.S. PATENT DOCUMENTS

| | | | | |
|---|---|---|---|---|
| 7,639,881 | B2 * | 12/2009 | Viola et al. ..................... | 382/226 |
| 8,032,822 | B1 * | 10/2011 | Artamonov et al. ........... | 715/221 |
| 8,230,384 | B1 * | 7/2012 | Krishnan et al. .............. | 717/100 |
| 8,646,429 | B2 * | 2/2014 | Agneray et al. ........... | 123/196 R |
| 2001/0013009 | A1 * | 8/2001 | Greening et al. ............... | 705/10 |
| 2002/0042041 | A1 * | 4/2002 | Owens et al. .................. | 434/322 |
| 2002/0147805 | A1 * | 10/2002 | Leshem et al. ................ | 709/223 |
| 2002/0152244 | A1 * | 10/2002 | Dean et al. ..................... | 707/530 |
| 2003/0080990 | A1 * | 5/2003 | Lyness .......................... | 345/713 |
| 2004/0083306 | A1 * | 4/2004 | Gloe ............................. | 709/245 |
| 2006/0010420 | A1 * | 1/2006 | Peterson et al. .............. | 717/106 |
| 2006/0259853 | A1 * | 11/2006 | Zellweger et al. .......... | 715/500.1 |

(Continued)

FOREIGN PATENT DOCUMENTS

JP   H01267773 A   10/1989
JP   08-263158 A   10/1996

(Continued)

OTHER PUBLICATIONS

Boyer et al. "The XForms Computation Engine: Rational, Theory and Implementation Experience", Aug. 2002, 9 pages, URL<http://lib.tkk.fi/Diss/2007/isbn9789512285662/article3.pdf>.*

*Primary Examiner* — Kavita Padmanabhan
*Assistant Examiner* — Mustafa Amin
(74) *Attorney, Agent, or Firm* — Cantor Colburn LLP

(57) ABSTRACT

A method, system, and a computer readable storage medium for visualizing total order relation of nodes included in structured document. The method includes acquiring log information, where the log information is created by storing information on transitions between nodes in a structured document in chronological order. The method also includes specifying a relation of relative positions of the nodes in the transitions based on acquired log information. The method further includes determining a total order relation of the nodes in the structured document by performing a topological sorting that uses specified relation as a constraint, where the total order relation of the nodes is determined by using content data of the node if the node is added to or removed from the structured document.

18 Claims, 8 Drawing Sheets

(56) References Cited

U.S. PATENT DOCUMENTS

| | | | |
|---|---|---|---|
| 2006/0280370 A1* | 12/2006 | Viola et al. | 382/229 |
| 2006/0294459 A1* | 12/2006 | Davis et al. | 715/513 |
| 2008/0027916 A1* | 1/2008 | Asai et al. | 707/3 |
| 2009/0265330 A1* | 10/2009 | Cheng et al. | 707/5 |
| 2009/0313086 A1* | 12/2009 | Lee et al. | 705/10 |
| 2010/0250611 A1* | 9/2010 | Krishnamurthy | 707/797 |
| 2011/0022945 A1* | 1/2011 | Yang | 715/234 |
| 2011/0047152 A1* | 2/2011 | Smith, III | 707/723 |
| 2011/0099205 A1* | 4/2011 | Shmueli et al. | 707/797 |
| 2011/0148879 A1* | 6/2011 | Moreno | 345/440 |
| 2011/0179370 A1* | 7/2011 | Cardno et al. | 715/771 |
| 2011/0258538 A1* | 10/2011 | Liu et al. | 715/256 |
| 2011/0276605 A1* | 11/2011 | Masson et al. | 707/803 |
| 2011/0307507 A1* | 12/2011 | Zhou et al. | 707/769 |
| 2012/0005234 A1* | 1/2012 | Tago et al. | 707/797 |
| 2012/0079502 A1* | 3/2012 | Kwan et al. | 718/106 |
| 2012/0215868 A1* | 8/2012 | Oliver et al. | 709/206 |
| 2012/0303671 A1* | 11/2012 | Chowdhury | 707/797 |
| 2013/0262518 A1* | 10/2013 | Goyal | 707/798 |

FOREIGN PATENT DOCUMENTS

| | | |
|---|---|---|
| JP | 09-160821 A | 6/1997 |
| JP | 11-338861 A | 12/1999 |
| JP | 2001060202 A | 3/2001 |
| JP | 2001-134360 A | 5/2001 |
| JP | 2003-150296 A | 5/2002 |
| JP | 2002149544 A | 5/2002 |
| JP | 2002-189595 A | 7/2002 |
| JP | 2002-334070 A | 11/2002 |
| JP | 2005-115498 A | 4/2005 |
| JP | 2008-176528 A | 7/2008 |
| JP | 2008225957 A | 9/2008 |
| JP | 2009015378 A | 1/2009 |
| JP | 2009-043102 A | 2/2009 |

* cited by examiner

VISUALIZING TOTAL ORDER RELATION OF NODES IN A STRUCTURED DOCUMENT

CROSS-REFERENCE TO RELATED APPLICATION

This application claims priority under 35 U.S.C. §119 from Japanese Patent Application No. 2010-264010 filed Nov. 26, 2010, the entire contents of which are incorporated herein by reference.

BACKGROUND OF THE INVENTION

1. Field of the Invention

The present invention is related to a software analysis system. More particularly, the present invention is related to a method, a system, and a computer readable storage medium for determining and visualizing a total order relation of nodes in a structured document.

2. Description of Related Art

In recent years, needs for analyzing user operation behavior have been increasing in order to allow users, including visually impaired users, to enjoy net surfing and the like. In cases of a structured document such as a web page, correct estimation, based on log information on user information, requires an order relation between the nodes included in the structured document.

The log information includes information including the history of movements between the nodes in the web page recorded by use of an expanded browser function. The log information also includes: information about operations of a user; and information on a relation of relative positions of a node corresponding to the current position of a user-operated cursor and a node corresponding to a cursor's next position, where both nodes are in the structured document.

For example, a document of a web page is structured with structure tags assigned in the HTML source. Specifically, the document is structured in a manner that each of various components of the web page, including texts and images, are assigned with structure tags, such as "heading," "paragraph," and "part desired to be emphasized."

In estimating of an order relation between nodes in a structured document, it is possible to specify a partial order relation between nodes, i.e., a relation of relative positions of a node corresponding to the current position of a user-operated cursor and a node corresponding to a cursor's next position. The partial order relation estimation, however, is difficult to discretely determine a total order relation, which includes the partial order relation between the nodes even when the target structured document is assumed to have a "correct total order."

For example, if a structured document has a tree structure, it is difficult to determine a total order relation without including any inconsistency between an actual order relation between nodes and a order relation of the nodes estimated based on log information. When nodes are added or deleted dynamically, the estimation of the order relation between the nodes becomes difficult.

SUMMARY OF THE INVENTION

Accordingly, one aspect of the present invention provides a method of visualizing total order relation of nodes in a structured document, method including the steps of: acquiring log information, where the log information is created by storing information on transitions between nodes in a structured document in chronological order; specifying a relation of relative positions of the nodes in the transitions based on acquired log information; and determining a total order relation of the nodes in the structured document by performing a topological sorting that uses specified relation as a constraint, where the total order relation of the nodes is determined by using content data of said node if the node is added to or removed from the structured document; and where at least one of the steps is carried out using a computer device.

Another aspect of the present invention provides a system for determining a total order relation of nodes in a structured document, the system including: a log information acquiring module for acquiring log information, where the log information is created by storing information on transitions between nodes in a structured document in chronological order; a positional-relation specifying module for specifying a relation of relative positions of the nodes in the transitions based on acquired log information; and a total-order-relation determining module for determining a total order relation of the nodes in the structured document by performing a topological sorting that uses specified relation as a constraint, where the total order relation of the nodes is determined by using content data of said node if the node is added to or removed from the structured document.

Another aspect of the present invention provides a computer readable storage medium tangibly embodying a computer readable program code having computer readable instructions which when implemented, cause a computer to carry out the steps of a method including: acquiring log information, where the log information is created by storing information on transitions between nodes in a structured document in chronological order; specifying a relation of relative positions of the nodes in the transitions based on acquired log information; and determining a total order relation of the nodes in the structured document by performing a topological sorting that uses specified relation as a constraint, where the total order relation of the nodes is determined by using content data of said node if the node is added to or removed from the structured document.

DETAILED DESCRIPTION OF THE PREFERRED EMBODIMENTS

Figure 1:
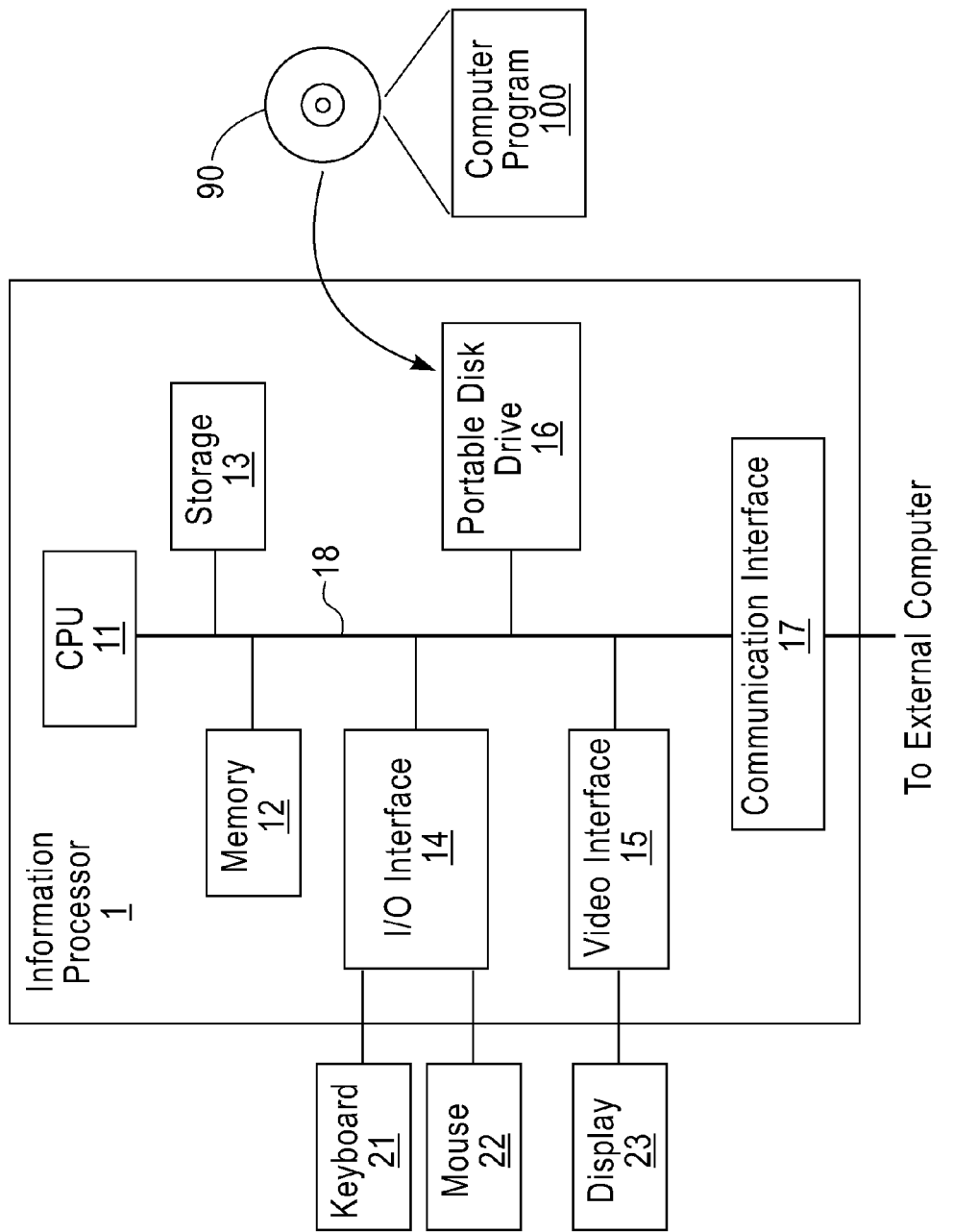
FIG. 1 shows a block diagram of a schematic configuration of an information processor according to an embodiment of the present invention.

The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

According to the embodiment of the present invention, a total order relation of nodes in a structured document can be determined based on log information on user operations. Even when the structure of the structured document is changed dynamically, it is possible to discretely estimate a relation of absolute positions of the nodes by checking whether or not data for contents of the nodes are consistent with each other, and to thereby display user operation behavior.

FIG. 1 is a block diagram schematically showing a configuration of an information processor according to an embodiment of the present invention. An information processor 1 according to the embodiment of the present invention includes at least a central processing unit (CPU) 11, a memory 12, a storage 13, an I/O interface 14, a video interface 15, a portable disk drive 16, a communication interface 17, and an internal bus 18 connecting the above-described hardware units with each other.

The CPU 11 is connected to the above-described hardware units of the information processor 1 via the internal bus 18, and is configured to control operations of the above-described hardware units while performing various software functions in accordance with a computer program 100 stored in the storage 13. A volatile memory such as an SRAM, an SDRAM or the like, is used as the memory 12, and a load module is loaded into the memory 12 in executing the computer program 100. The memory 12 is configured to store temporary data and the like generated in executing the compute program 100.

A built-in stationary storage (hard disk), a ROM or the like is used as the storage 13. The computer program 100 stored in the storage 13 is downloaded from a portable recording medium 90, such as a DVD, a CD-ROM or the like, in which a program, data and the like are recorded, by the portable disk drive 16, and is loaded from the storage 13 into the memory 12 to be executed. Naturally, a computer program downloaded from an external computer connected to the hardware units via the communication interface 17 can be used, instead.

The communication interface 17 is connected to the internal bus 18, and is capable of exchanging data with an external computer and the like by being connected to an external network such as the Internet, a LAN, a WAN or the like.

The I/O interface 14 is connected to a keyboard 21 and a mouse 22, and is configured to receive data inputs. The video interface 15 is connected to a display 23, and is configured to display desired images. A log of operations by a user performed on an image displayed on the display 23 is stored as log information.

Figure 2:
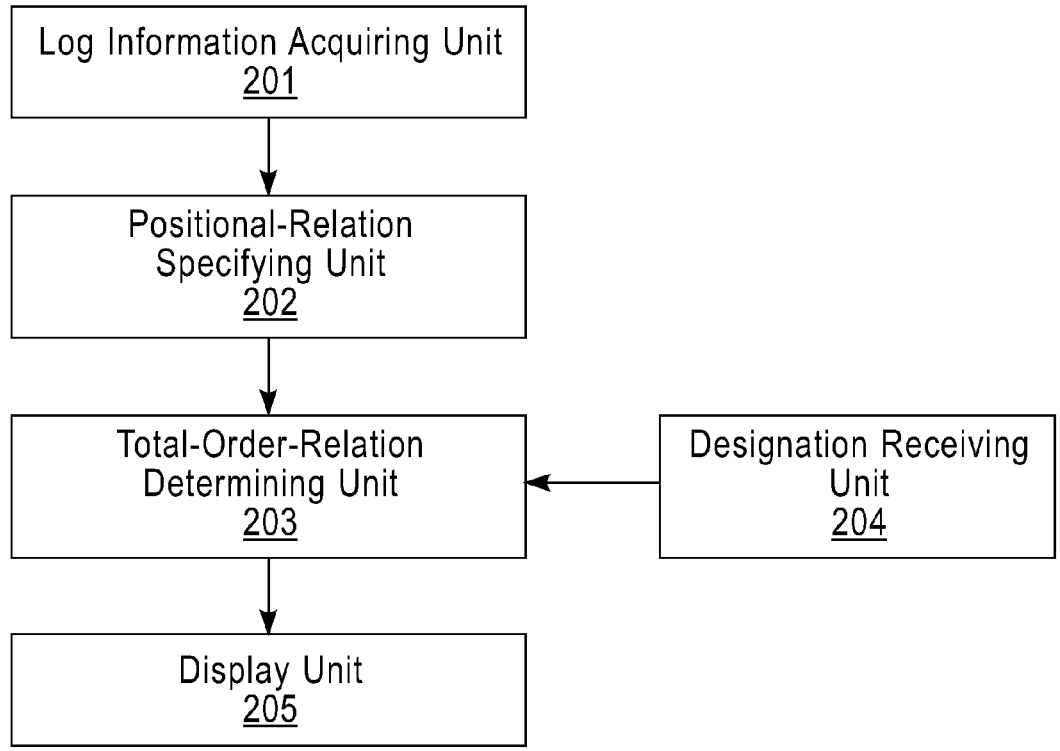
FIG. 2 illustrates a functional block diagram of the information processor according to the embodiment of the present invention.

FIG. 2 illustrates a functional block diagram of the information processor 1 according to the embodiment of the present invention. In FIG. 2, a log information acquiring unit 201 of the information processor 1 acquires log information created by storing information pieces on transitions between nodes in a structured document in chronological order.

The log information is stored as a set of entries of the structured document. The format of the log information can be expressed as an example in Expression 1.

$$\text{entry}::=(\text{time},\text{op},\text{nodeID},\text{text}) \qquad \text{Expression 1}$$

In Expression 1, "time" represents a relative time point at which an operation is performed in relation to a time point at which the user started to browse a page targeted for log information; "op" represents the type of operation performed by the user; and "nodeID" represents a node ID which identifies a node reached by the operation in "op." Accordingly, a "nodeID" of a previous node before movement by the operation in "op" can easily be identified based on the type of operation in "op." In other words, the "nodeID" of the previous node can be obtained by performing a back-calculation based on the amount of movement between the nodes which can be specified based on the operation type.

The structured document can be expressed as a sequence of nodes. Each node includes data for a content of the node. For example, the data can include text data which can be read aloud in synthetic voice or the like. The data for the content of the node are not limited to any particular data as long as they can identify the content, including as text data, image data and/or the like. Types of nodes include: a text node which itself is text data; a heading node showing a header, footer or the like; a link node showing a link destination; a form control node showing a text box, a button or the like; and the like. Even a non-text node such as an image node can have text data if the creator of the content gives alternative text data to the node.

Types of operations performed by the user include any operations. For example, the operations include: move to page top; move to page end; move to next node; move to previous node; move 10 nodes ahead; move 10 nodes back; move to next link; move to previous link; move to next heading node; move to previous heading node; and move in web page, e.g. jump using an in-page link. For an operation for simple move between nodes, the amount of movement between the nodes can easily be specified based on the type of the corresponding operation.

For the node ID, one can use a node address, a node path, data for content of the node or a combination of these. Naturally, when nodes are added or deleted dynamically, node IDs also change dynamically.

In the embodiment of the present invention, the term "text" represents text data of the node as data for the content of the node. In addition, the log information includes the text data of each node, and nodes that are identical to each other are searched out by using key information pieces, where each of key information pieces are created by combining a node ID and corresponding text data. In this way, a total order relation of nodes, which cannot be determined solely from a relation of relative positions of the nodes, can be judged by combining the node ID and corresponding text data, in order to decide whether or not the nodes are identical to each other based on each created combinations. For example, nodes that are not identical but have the same node ID can be distinguished from each other based on the difference of text data.

A positional-relation specifying unit 202 specifies a relation of relative positions of nodes in a transition, based on the acquired log information. Since the log information includes a type of operation performed by the user and a node ID identifying the reached node, it is possible to specify the relation of relative positions of the nodes from the amount of movement between the nodes, where the amount of movement is obtained from the type of operation.

Figure 3A:
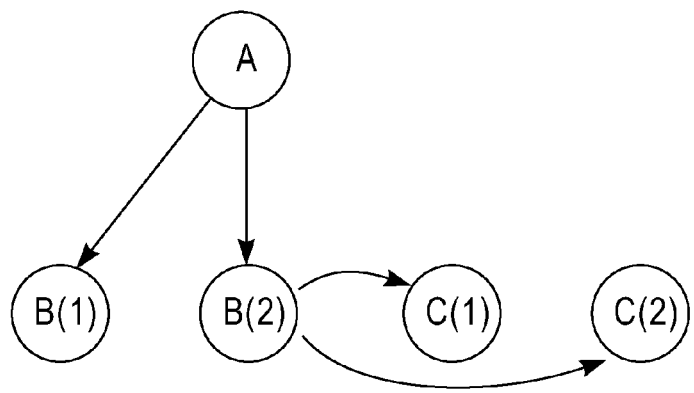
FIG. 3A shows an example of specifying a relation of relative positions by the information processor when transitions are made from one node to another according to the embodiment of the present invention.
Figure 3B:
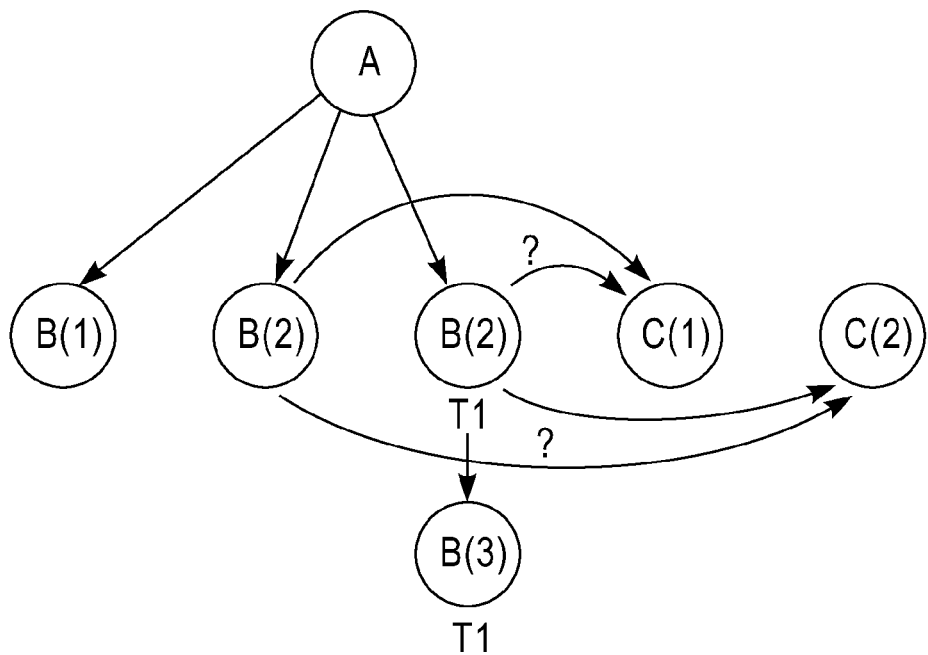
FIG. 3B shows an example of specifying a relation of relative positions by the information processor when a new node is added to a position between a node and an old node according to the embodiment of the present invention.

FIGS. 3A and 3B show examples of specifying relations of relative positions by the information processor 1 according to the embodiment of the present invention. As shown in FIG. 3A, transitions are made from Node A to Node B(1) and Node B(2), and from Node B(2) to two nodes, Node C(1) and Node C(2).

For example, assume that the transition from Node B(2) to Node C(1) is based on an operation "move to next node," and the transition from Node B(2) to Node C(2) is based on an operation "move 10 nodes ahead." In this case, two relations of relative positions are specified, i.e. B(2)<C(1) and B(2)<C(2).

As shown in FIG. 3B, if new Node B(2) is added to a position between Node B(1) and old Node B(2), old Node B(2) is changed to new Node B(3). If a transition is made from new Node B(2) to Node C(1) based on an operation "move to next node," and a transition is made from new Node B(2) to Node C(2) based on an operation "move 10 nodes ahead," after the addition, for example, two relations of relative positions are specified, i.e. B(2)<C(1) and B(2)<C(2). However, a total order relation of the nodes cannot be determined since it is impossible to tell whether Node B(2) is old Node B(2) or new Node B(2), which is newly added.

To address this situation, a total-order-relation determining unit 203 determines a total order relation of the nodes included in the structured document by performing topological sorting using the specified relations of relative positions of the nodes as constraints. When a node included in the structured document is added or deleted, the total-order-relation determining unit 203 determines a total order relation of the nodes based on the text data associated respectively with the node IDs.

Figure 4:
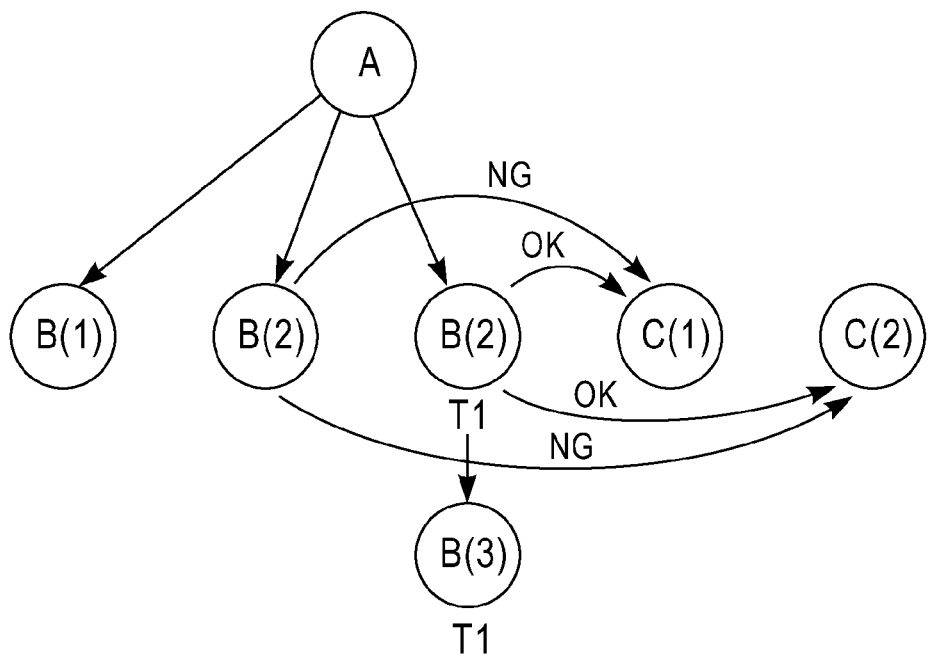
FIG. 4 shows an example of determining a total order relation by the information processor according to the embodiment of the present invention.

FIG. 4 shows an example of determining a total order relation by the information processor 1 according to the embodiment of the present invention. When new Node B(2) is added to a position between Node B(1) and old Node B(2) as in FIGS. 3A and 3B, old Node B(2) is changed to new Node B(3). If a transition is made from new Node B(2) to Node C(1) based on an operation "move to next node," and a transition is made from new Node B(2) to Node C(2) based on an operation "move 10 nodes ahead," after the addition, for example, two relations of relative positions are specified, i.e. B(2)<C(1) and B(2)<C(2).

Only with such information, it is impossible to tell whether Node B(2) is an old Node B(2) or a new Node B(2) which is newly added. For this reason, a difference in given text data among the nodes, if any, is used to find out about Node B(2). First, text data T1 is given to old Node B(2), that is, new Node B(3). If Node B(2) is old Node B(2), the relations of relative positions to be specified are (B(2), T1)<C(1) and (B(2), T1)<C(2) since the text data T1 is given to old Node B(2). If node B(2) is new Node B(2), the relations of relative positions to be specified are B(2)<C(1) and B(2)<C(2) since different text data are given to new Node B(2). Since the text data given to old Node B(2) in actual are the text data T1, it is possible to find out whether Node B(2) is old Node B(2) or new Node B(2) by excluding the node not given the text data T1. In other words, by comparing the relation of relative positions in both of the cases, Node B(2) is identified as old Node B(2). In this way, the relation of absolute positions of the nodes can be discretely estimated, and the total order relation of the nodes can be determined if sufficient information pieces are collected for the log information.

As described above, it is possible to judge whether or not the nodes having different node IDs are identical to each other, by deciding whether or not the text data of the nodes are consistent with each other. Alternatively, nodes having the same node ID or nodes having different node IDs but having the same text data can be extracted as identical nodes before identification of the relation of relative positions, where the extraction uses a combination of a node ID and text data as a unit of key information. In this way, it is possible to check in advance whether or not there are identical nodes, and to thereby prevent a situation of misidentifying nodes as different nodes even though the nodes simply have different node IDs due to addition or deletion of a node. Naturally, a designation receiving unit 204 can be provided to receive designation of identical nodes in advance, instead.

Figure 5:
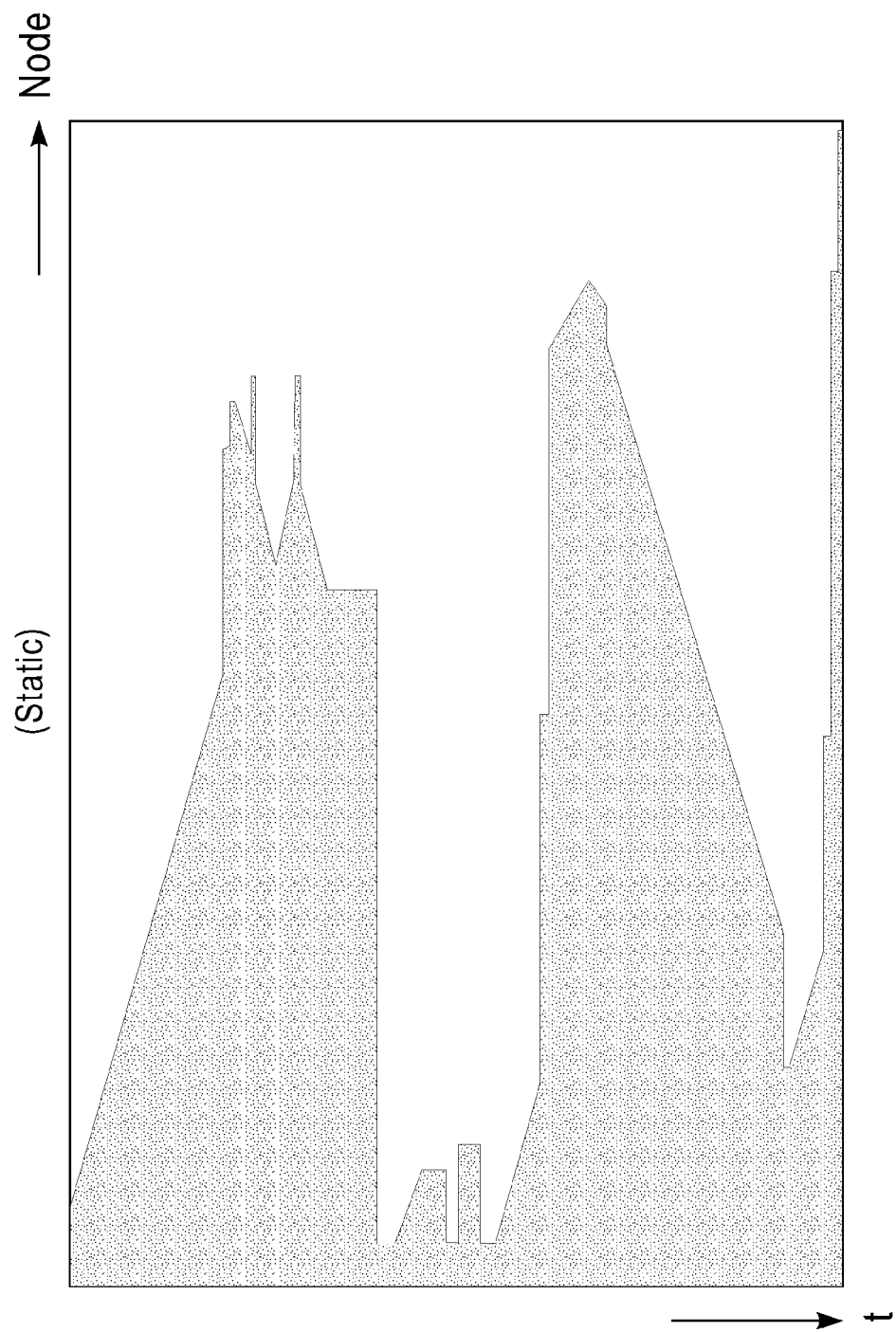
FIG. 5 shows an example of graphically presenting a determined total order relation by the information processor according to the embodiment of the present invention.

A display unit 205 graphically displays the total order relation of the nodes determined by the total-order-relation determining unit 203. FIG. 5 shows an example of graphically displaying the total order relation determined by the information processor 1 according to the embodiment of the present invention.

FIG. 5 graphically shows user operation behavior, where the vertical axis indicates elapsed time while the horizontal axis indicates the node position corresponding to the position of the cursor operated by the user in the web page. In the example in FIG. 5, the position starts from the upper left as the origin, gradually moves to a node on the right side of the screen (which is considered as a forward direction), undergoes a transition around the center of the screen, and then jumps in a reverse direction at one stroke. Thereafter, the position undergoes a transition around the left end of the screen, jumps in the forward direction at one stroke, starts a transition in the reverse direction by judging that a desired position has been passed through, and then starts a transition in the forward direction by judging that the previous transition has reached too far. As described above, if the relations of absolute positions of the nodes are estimated discretely and log information pieces are collected sufficiently, the total order relation of the nodes can be determined, and thereby the behavior of the actual user operations can be displayed correctly.

Figure 6:
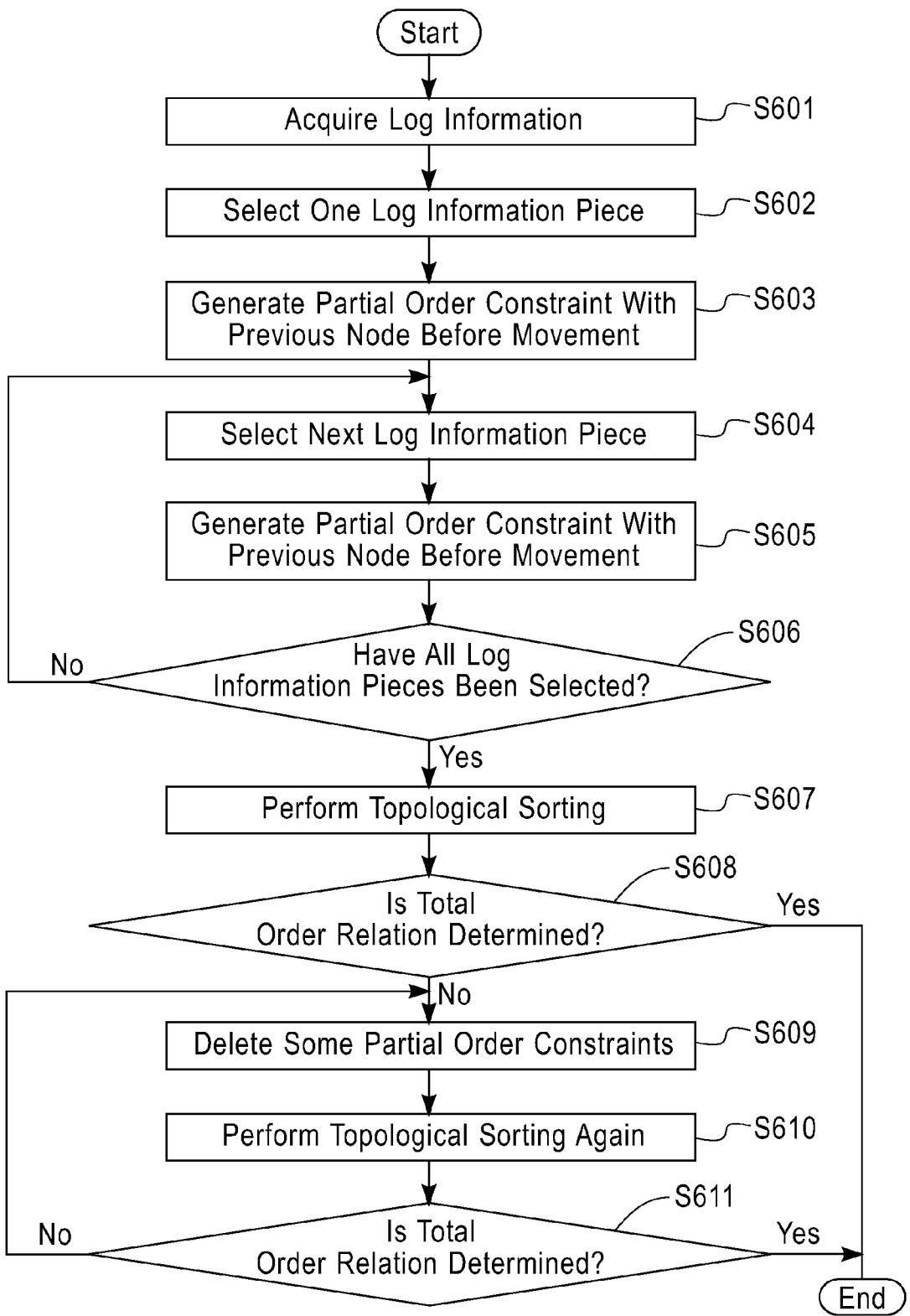
FIG. 6 shows a flowchart of a procedure of processing performed by a CPU of the information processor according to the embodiment of the present invention.

FIG. 6 is a flowchart showing a procedure of processing performed by the CPU 11 of the information processor 1 according to the embodiment of the present invention. Described in the example in FIG. 6 is a case in which the structured document has a tree structure and path information in the tree structure is given to each node as a node ID.

In FIG. 6, the CPU 11 of the information processor 1 acquires log information (Step S601). Each piece of the acquired log information includes at least a node ID, which is identification information for identifying the node, the type of operation performed for the node, a relative time period at which the operation was performed, and the text data of the node, for example.

Figure 7:
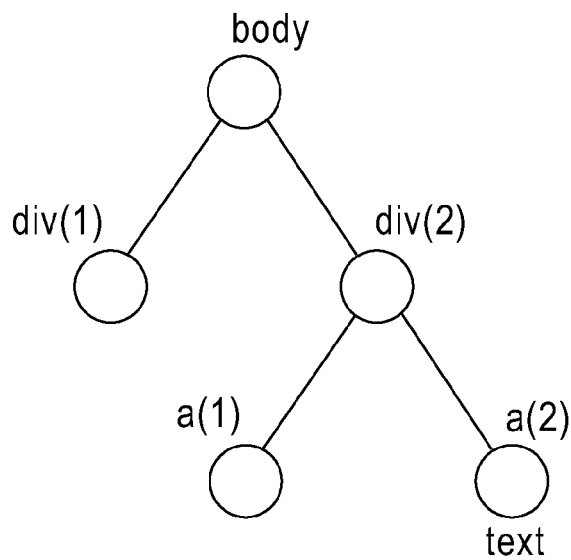
FIG. 7 shows an example of path information of nodes when a structured document has a tree structure.

FIG. 7 shows an example of the path information of the nodes when the structured document has a tree structure. In the example in FIG. 7, a root node "body" branches to two lower level nodes "div(1)" and "div(2)," and the node "div(2)" branches to two further-lower level nodes "a(1)" and "a(2)." Text data "text" are given to the node "a(2)."

In this case, the path information for the node "a(2)" can be expressed as in Expression 2 by using a so-called XPath expression.

$$XPath=/body/div(2)/a(2)<\text{text}> \hspace{2em} \text{Expression 2}$$

In the conventional technique, when the part of the right-hand side of Expression 2 excluding the text data is used as a node ID, each node can be identified in the tree structure by following the path, as long as no node is added or deleted and the tree structure does not change. However, if a node is added or deleted and if the tree structure changes, it becomes impossible to follow the path.

In this problem, a node ID also includes text data in this embodiment. This makes it possible to check whether or not the text data of nodes are consistent with each other even when a node is added or deleted and the tree structure changes, and thereby to easily judge whether or not nodes are identical to each other even when the path information changes due to the addition or deletion of the node.

Returning to FIG. 6, the CPU 11 of the information processor 1 selects one log information piece from the acquired log information (Step S602) and generates a partial order constraint for the node included in the log information piece and the previous node before the movement, based on the type of operation performed for the node included in the log information piece (Step S603). The partial order constraint is defined as a relation of relative positions of the nodes which is specified based on the type of operation performed for the node.

For example, as to Node n1 and Node n2, if a move from Node n1 to Node n2 in the forward direction is made, a relation of relative positions, n1<n2, is specified. Similarly, if a move from Node n2 to Node n1 in the forward direction is made, a relation of relative positions, n1>n2, is specified. By performing topological sorting using the specified relation of relative positions as a constraint condition, a total order relation of the nodes can be determined.

The CPU 11 selects the next log information piece (Step S604), and then generates partial order constraints for the node included in the log information piece and the previous node before the movement, based on the type of operation performed for the node included in the log information piece (Step S605). The CPU 11 judges whether or not all the log information pieces have been selected (Step S606). When judging that not all the log information pieces have been selected (Step S606: NO), the CPU 11 returns the processing to Step S604 and repeats the above-described processing.

When judging that all the log information pieces have been selected (Step S606: YES), the CPU 11 performs topological sorting to determine a total order relation satisfying all the generated partial order constraints (Step S607).

The CPU 11 judges whether or not a total order relation is determined by performing the topological sorting (Step S608). When judging that a total order relation is not determined (Step S608: NO), the CPU 11 deletes some of the partial order constraints (Step S609), and then performs topological sorting again (Step S610). In this topological sorting, the text data of the node is included in each node ID, different from conventional topological sorting. This makes it possible to check whether or not the text data of nodes are consistent with each other even when the tree structure is changed, and thereby to easily judge whether or not nodes are identical to each other even when the path information is changed due to addition or deletion of the node. Specifically, for the identical nodes, topological sorting is performed again by applying one of the node IDs to the nodes.

The CPU 11 judges whether or not a total order relation is determined by performing the topological sorting again (Step S611). When judging that a total order relation is not determined (Step S611: NO), the CPU 11 returns the processing to Step S609 and repeats the above-described processing.

When judging that a total order relation is determined (Step S608: YES, Step S611: YES), the CPU 11 terminates the processing, and displays, on the display 23, relations of the absolute positions according to the node transitions in chronological order. Specifically, the relations are displayed as a view showing the user operation behavior as shown in FIG. 5 as an example.

Some partial order constraints can cause a loop state in the order relation of the nodes. Many of the cases in which it is judged that a total order relation is not determined in Step S611 are applicable to this situation. This is because erroneous partial order constraints are generated due to a change in the path information or the text data of a node.

Figure 8A:
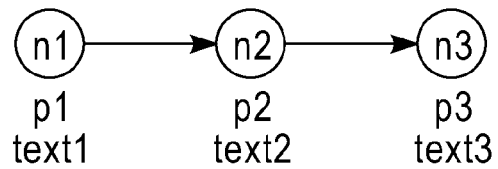
FIG. 8A shows an example of a correct order of an initial state when only text data of a node is changed and no loop state occurs.
Figure 8B:
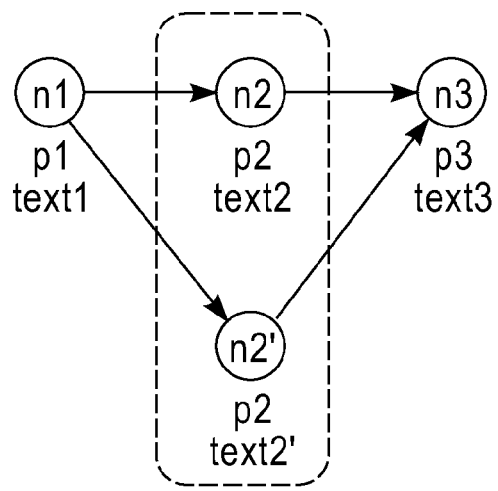
FIG. 8B shows an example of generated order relations that correspond to the partial order constraints when only text data of a node is changed and when no loop state occurs.

FIGS. 8A and 8B show a case in which only text data of a node is changed and no loop state occurs. In FIGS. 8A and 8B, each order relation is shown by an arrow. As shown in FIG. 8A, the correct order of nodes is n1<n2<n3 in an initial state. Path information pieces of Nodes n1, n2 and n3 are denoted by p1, p2 and p3, respectively, and text data of the nodes are denoted by text1, text2 and text3, respectively.

When a move is made from Node n1 to Node n2 and then to Node n3 sequentially, the text data of Node n2 is changed to text2'. If a move is thereafter made from Node n3 to node n2 and to then Node n1 sequentially, partial order constraints to be generated are as shown in Expression 3. In Expression 3, each node is represented by a combination of (path information, text data), and (p2, text2) and (p2, text2') are treated as different nodes.

$$(p1, text1) < (p2, text2)$$

$$(p2, text2) < (p3, text3)$$

$$(p2, text2') < (p3, text3)$$

$$(p1, text1) < (p2, text2') \hspace{2cm} \text{Expression 3}$$

By solving the partial order constraints shown in Expression 3, the order relations as shown in FIG. 8B are generated. In other words, the order relations can be expressed as shown in Expression 4. In Expression 4, the symbol ":" is defined as the order of two adjacent nodes is not decided.

$$(p1, text1) < (p2, text2):(p2, text2') < (p3, text3) \hspace{1cm} \text{Expression 4}$$

When only the text data of a node is changed, Node (p2, text2) and Node (p2, text2'), for example, are originally the same node. Accordingly, no problem occurs even though the order relation is not decided for the nodes.

Figure 9A:
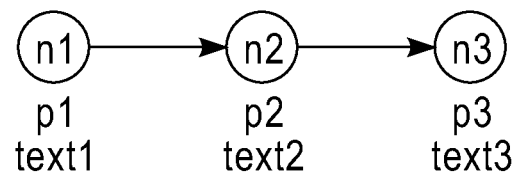
FIG. 9A shows an example of a correct order of an initial state when only path information of a node is changed and no loop state occurs.
Figure 9B:
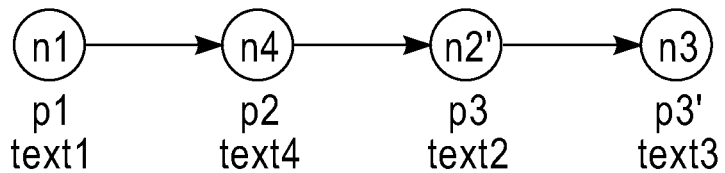
FIG. 9B shows an example of order relations, where path information of nodes changes and where no loop state occurs.
Figure 9C:
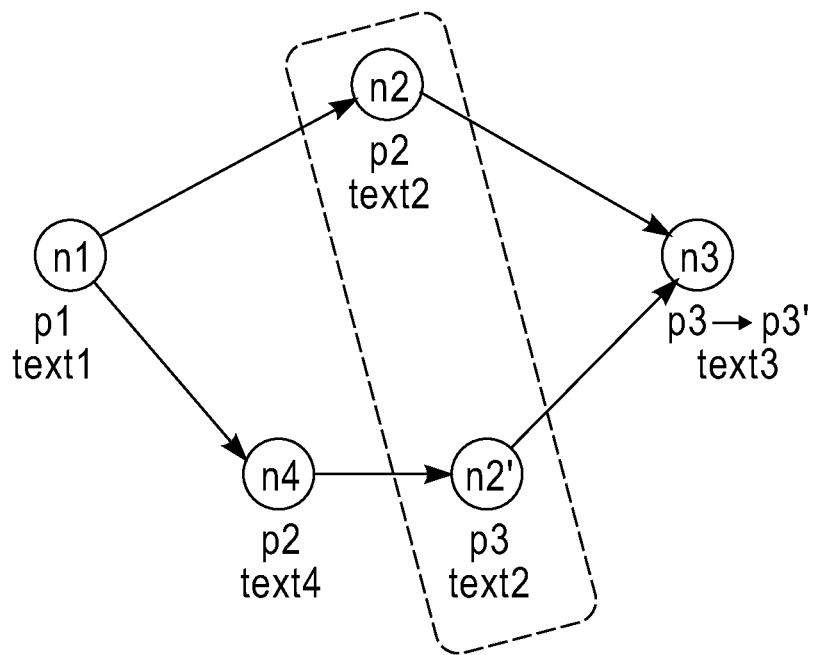
FIG. 9C shows an example of order relations generated by solving the partial order constraints where only path information of a node is changed and no loop state occurs.

FIGS. 9A to 9C show an example of a case in which only path information of a node is changed and no loop state occurs. Also in FIGS. 9A to 9C, each order relation is shown by an arrow. As shown in FIG. 9A, the correct order of nodes is n1<n2<n3 in an initial state. Path information pieces of Nodes n1, n2 and n3 are denoted by p1, p2 and p3, respectively, and text data of the nodes are denoted by text1, text2 and text3, respectively.

Assume that when a move is made from Node n1 to Node n2 and to then Node n3 sequentially, Node n4 having text data text4 is added to a position between Node n1 and Node n2, and thereby the path information piece of Node n4 is denoted by p2 while the path information pieces of Node n2 and Node n3 are changed respectively to p3 and p3', as shown in FIG. 9B. If a move is thereafter made from Node n3 to Node n2, to Node n4 and to then Node n1 sequentially, partial order constraints to be generated are as shown in Expression 5. Also in Expression 5, each node is represented by a combination of (path information, text data), and (p3, text2) and (p3, text3) are treated as different nodes.

$$(p1, text1) < (p2, text2)$$

$$(p2, text2) < (p3, text3)$$

$$(p3, text2) < (p3', text3)$$

$(p2, \text{text4}) < (p3, \text{text2})$ $(p1, \text{text1}) < (p2, \text{text4})$                        Expression 5

By solving the partial order constraints shown in Expression 5, the order relations shown in FIG. 9C are generated. In FIG. 9C, since Nodes n2 and n2' are originally the same node, no problem occurs even though the order relation is not decided for the nodes.

Figure 10A:
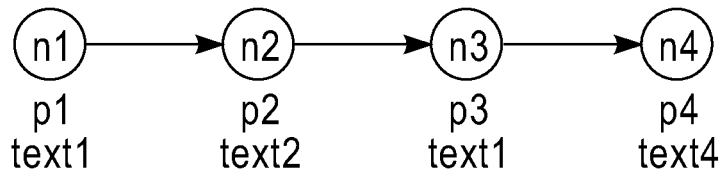
FIG. 10A shows an example a correct order of an initial state when a loop state occurs.

FIGS. 10A to 10O show an example of a case in which a loop state occurs. As shown in FIG. 10A, the correct order of nodes is n1<n2<n3<n4 in an initial state. Path information pieces of Nodes n1, n2, n3 and n4 are denoted by p1, p2, p3 and p4, respectively, and text data of the nodes are denoted by text1, text2, text1 and text4, respectively. This means that text data of Node n1 and Node n3 are the same.

Figure 10B:
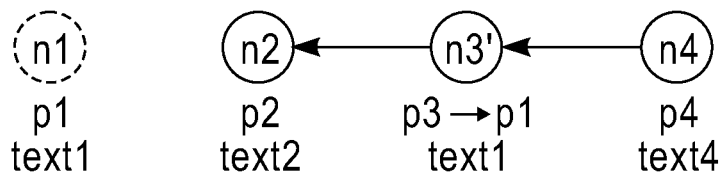
FIG. 10B shows an example of order relations, where path information of nodes changes and where a loop state occurs.

Assume that, when a move is made from Node n1 to Node n2, to Node N3 and to then Node n4 sequentially, Node n1 is deleted and the path information piece of Node n3 is changed to p1, as shown in FIG. 10B. If a move is thereafter made from Node n4 to Node n3 and to then Node n2 sequentially, partial order constraints to be generated are as shown in Expression 6. Also in Expression 6, each node is represented by a combination of (path information, text data).

$(p1, \text{text1}) < (p2, \text{text2})$ $(p2, \text{text2}) < (p3, \text{text1})$ $(p3, \text{text1}) < (p4, \text{text4})$ $(p4, \text{text4}) < (p1, \text{text1})$ $(p2, \text{text2}) < (p1, \text{text1})$                        Expression 6

Figure 10C:
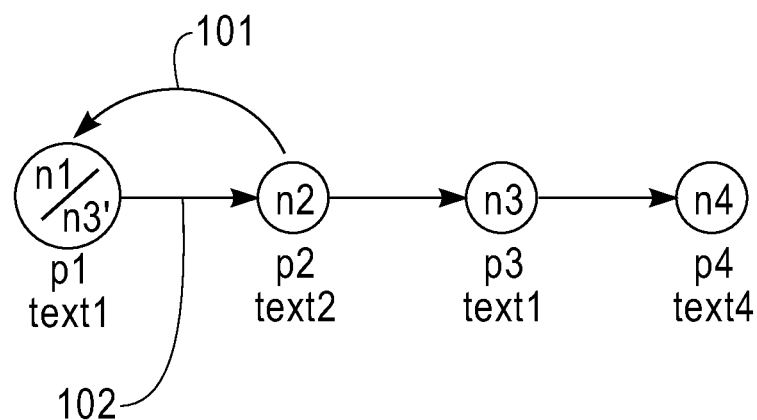
FIG. 10C shows an example of order relations, when partial constraint is deleted and where loop state is canceled.

In the set of partial order constraints shown in Expression 6, a loop state is occurring between Node (p1, text1) and Node (p2, text2) as shown in FIG. 10C. In this case, a partial order constraint to be deleted is selected from the partial order constraints forming the loop, in the following procedure.

The partial order constraint which is added the last of all in terms of time is deleted first. In FIG. 10C, by deleting the partial order (p2, text2)<(p1, text1) shown by an arrow 101, the loop state is cancelled.

Alternatively, the partial order constraint which is added the first of all in terms of time can be deleted. In FIG. 10C, the loop state is cancelled also by deleting the partial order constraint (p1, text1)<(p2, text2) shown by an arrow 102.

Naturally, the partial order constraint which has been included for the longest time period since a predetermined time point can be deleted, instead. In this way, if no loop state has occurred at the predetermined time point, the set of partial order constraints can be made close to those of the predetermined time point.

In any case, a partial order constraint is sequentially deleted in the above-described procedure until the loop state is cancelled, and a total order relation can be determined when the loop state is cancelled.

According to the above-described embodiment, a total order relation of nodes in a structured document can be determined based on log information on user operations. Even when the structure of the structured document is changed dynamically, it is possible to discretely estimate a relation of absolute positions of the nodes by checking whether or not text data for contents of the nodes are consistent with each other, and to thereby display user operation behavior.

It should be again noted that the present invention is not limited to the above-described embodiment, and various alternations, improvements and the like are possible within the scope of the spirit of the present invention.

What is claimed is:

1. A method of determining a total order relation of nodes in a structured document, the method comprising the steps of:
   acquiring log information created by storing information on transitions between nodes in the structured document in chronological order, wherein the acquired log information includes a plurality of entries that each comprise a type of an operation performed by a user, a relative time at which the operation was performed, a node identification of a node reached by the operation, and a text data of the node reached by the operation;
   specifying a relation of relative positions of said nodes in said transitions based on acquired log information; and
   determining the total order relation of said nodes in said structured document by performing a topological sorting that uses the relation as a constraint,
   wherein said total order relation of said nodes is further determined by using the text data of each of said nodes to check whether or not any identical nodes are included by using a combination of said node identification and said text data of said node as a unit of key information, and
   wherein at least one of the steps is carried out using a computer device.

2. The method according to claim 1, further comprising the step of: displaying determined total order relation of said nodes.

3. The method according to claim 1, wherein:
   said log information comprises at least one information on amount of movement between said nodes; and
   said relation of relative positions is specified based on said amount of movement between said nodes.

4. The method according to claim 1, wherein:
   said structured document comprises a tree structure.

5. The method according to claim 4, wherein amount of movement between said nodes is specified based on said type of operation performed for a corresponding node in said log information.

6. The method according to claim 4, further comprising the step of:
   receiving designation of said identical nodes.

7. A system for determining a total order relation of nodes in a structured document, the system comprising a processor embodied in hardware, the processor configured to perform a method comprising:
   acquiring log information created by storing information on transitions between nodes in the structured document in chronological order, wherein the acquired log information includes a plurality of entries that each comprise a type of an operation performed by a user, a relative time at which the operation was performed, a node identification of a node reached by the operation, and a text data of the node reached by the operation;
   specifying a relation of relative positions of said nodes in said transitions based on acquired log information; and
   determining the total order relation of said nodes in said structured document by performing a topological sorting that uses the relation as a constraint,
   wherein said total order relation of said nodes is further determined by using the text data of each of said nodes to check whether or not any identical nodes are included by using a combination of said node identification and said text data of said node as a unit of key information.

8. The system according to claim 7, wherein the method further comprises displaying determined total order relation of said nodes.

9. The system according to claim 7, wherein:
said log information comprises at least one information on amount of movement between said nodes; and
said relation of relative positions is specified based on said amount of movement between said nodes.

10. The system according to claim 7, wherein:
said structured document comprises a tree structure.

11. The system according to claim 10, wherein amount of movement between said nodes is specified based on said type of operation performed for a corresponding node in said log information.

12. The system according to claim 10, wherein the method further comprises receiving designation of said identical nodes.

13. A non-transitory computer readable storage medium tangibly embodying a computer readable program code having non-transitory computer readable instructions which when implemented, cause a computer to carry out the steps of a method comprising:
acquiring log information created by storing information on transitions between nodes in the structured document in chronological order, wherein the acquired log information includes a plurality of entries that each comprise a type of an operation performed by a user, a relative time at which the operation was performed, a node identification of a node reached by the operation, and a text data of the node reached by the operation;
specifying a relation of relative positions of said nodes in said transitions based on acquired log information; and
determining the total order relation of said nodes in said structured document by performing a topological sorting that uses specified relation as a constraint,
wherein said total order relation of said nodes is further determined by using text data of each of said nodes to check whether or not any identical nodes are included by using a combination of said node identification and said text data of said node as a unit of key information.

14. The non-transitory computer readable storage medium according to claim 13, further comprising the step of:
displaying determined total order relation of said nodes.

15. The non-transitory computer readable storage medium according to claim 13, wherein:
said log information comprises at least one information on amount of movement between said nodes; and
said relation of relative positions is specified based on said amount of movement between said nodes.

16. The non-transitory computer readable storage medium according to claim 13, wherein:
said structured document comprises a tree structure.

17. The non-transitory computer readable storage medium according to claim 16, wherein amount of movement between said nodes is specified based on said type of operation performed for a corresponding node in said log information.

18. The non-transitory computer readable storage medium according to claim 16, further comprising the step of:
receiving designation of said identical nodes.

* * * * *